United States Patent
Naguib et al.

(10) Patent No.: US 8,280,430 B2
(45) Date of Patent: *Oct. 2, 2012

(54) ANTENNA ARRAY CALIBRATION FOR MULTI-INPUT MULTI-OUTPUT WIRELESS COMMUNICATION SYSTEMS

(75) Inventors: Ayman Fawzy Naguib, Cupertino, CA (US); Alexei Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 910 days.

This patent is subject to a terminal disclaimer.

(21) Appl. No.: 11/405,944

(22) Filed: Apr. 17, 2006

(65) Prior Publication Data

US 2007/0099573 A1 May 3, 2007

Related U.S. Application Data

(60) Provisional application No. 60/733,021, filed on Nov. 2, 2005.

(51) Int. Cl.
*H04M 1/00* (2006.01)

(52) U.S. Cl. ............... 455/550.1; 455/562.1; 455/445; 455/67.11; 455/522; 455/423; 342/174; 342/378; 340/572.1

(58) Field of Classification Search ........... 455/423, 455/561, 562.1, 67.14
See application file for complete search history.

(56) References Cited

U.S. PATENT DOCUMENTS

| | | | |
|---|---|---|---|
| 5,008,900 A | 4/1991 | Critchlow et al. | |
| 6,037,898 A | 3/2000 | Parish et al. | |
| 6,188,896 B1 | 2/2001 | Perahia et al. | |
| 6,448,939 B2 | 9/2002 | Maruta | |
| 6,462,704 B2 | 10/2002 | Rexberg et al. | |
| 6,600,445 B2 | 7/2003 | Li | |
| 6,615,024 B1* | 9/2003 | Boros et al. | 455/67.14 |
| 6,661,284 B1 | 12/2003 | Luz et al. | |
| 6,690,952 B2 | 2/2004 | Nishimori et al. | |
| 6,778,147 B2 | 8/2004 | Sanada et al. | |
| 6,801,867 B2 | 10/2004 | Bortnyk | |
| 6,876,870 B2 | 4/2005 | Hiramatsu et al. | |
| 6,888,809 B1 | 5/2005 | Foschini et al. | |
| 6,904,290 B2 | 6/2005 | Palenius | |
| 6,947,768 B2 | 9/2005 | Adachi et al. | |
| 7,031,669 B2 | 4/2006 | Vaidyanathan et al. | |
| 7,035,592 B1 | 4/2006 | Doi et al. | |
| 7,079,514 B2 | 7/2006 | Kim et al. | |

(Continued)

FOREIGN PATENT DOCUMENTS

CN 1507168 A 6/2004

(Continued)

OTHER PUBLICATIONS

International Search Report-PCT/US2006/060502, International Search Authority-European Patent Office-May 24, 2007.

(Continued)

*Primary Examiner* — Charles Shedrick

(74) *Attorney, Agent, or Firm* — Dmitry R. Milikovsky; Howard Seo

(57) ABSTRACT

Calibration for a transmit chain of a device transmitting information to multiple devices over wireless links and receive chains of the multiple devices receiving information over one of the wireless links utilizing each of the estimates for different antennas of an access terminal as a separate estimate.

8 Claims, 9 Drawing Sheets

U.S. PATENT DOCUMENTS

| | | | |
|---|---|---|---|
| 7,133,698 B2 | 11/2006 | Miyoshi et al. |
| 7,184,734 B2 | 2/2007 | Yuda et al. |
| 7,205,936 B2 | 4/2007 | Park et al. |
| 7,280,072 B2 | 10/2007 | Mallick |
| 7,304,605 B2 | 12/2007 | Wells |
| 7,313,174 B2 | 12/2007 | Alard et al. |
| 7,392,016 B2 | 6/2008 | Tsien et al. |
| 7,403,798 B2 | 7/2008 | Doi |
| 2001/0005685 A1 | 6/2001 | Nishimori et al. |
| 2001/0011961 A1 | 8/2001 | Rexberg et al. |
| 2001/0020919 A1 | 9/2001 | Maruta et al. |
| 2002/0103013 A1 | 8/2002 | Watson et al. |
| 2003/0040880 A1 | 2/2003 | Bortnyk et al. |
| 2003/0058166 A1 | 3/2003 | Hirabe |
| 2003/0064752 A1 | 4/2003 | Adachi et al. |
| 2003/0064762 A1 | 4/2003 | Tanabe et al. |
| 2003/0227408 A1 | 12/2003 | Sanada et al. |
| 2004/0048580 A1 | 3/2004 | Lunn et al. |
| 2004/0048584 A1 | 3/2004 | Vaidyanathan et al. |
| 2004/0105386 A1 | 6/2004 | Sipola |
| 2004/0142729 A1 | 7/2004 | Yuda et al. |
| 2004/0166808 A1 | 8/2004 | Hasegawa et al. |
| 2004/0217920 A1 | 11/2004 | Ishikawa |
| 2004/0266483 A1 | 12/2004 | Choi |
| 2005/0130663 A1 | 6/2005 | Hong et al. |
| 2005/0162305 A1 | 7/2005 | Wells et al. |
| 2005/0164664 A1 | 7/2005 | DiFonzo et al. |
| 2006/0019712 A1 | 1/2006 | Choi et al. |
| 2006/0232470 A1 | 10/2006 | Mallick et al. |
| 2006/0240784 A1 | 10/2006 | Naguib et al. |
| 2006/0284725 A1 | 12/2006 | Naguib et al. |
| 2006/0286974 A1 | 12/2006 | Gore et al. |
| 2006/0293087 A1 | 12/2006 | Tsutsui et al. |
| 2007/0099570 A1 | 5/2007 | Gao et al. |
| 2007/0099670 A1 | 5/2007 | Naguib et al. |
| 2007/0224942 A1 | 9/2007 | Kuramoto et al. |
| 2007/0225042 A1 | 9/2007 | Kitahara et al. |
| 2008/0004078 A1 | 1/2008 | Barratt et al. |

FOREIGN PATENT DOCUMENTS

| | | |
|---|---|---|
| EP | 0642191 | 3/1995 |
| EP | 0654915 | 5/1995 |
| EP | 1104122 | 5/2001 |
| GB | 2346013 | 7/2000 |
| JP | 01213038 | 8/1989 |
| JP | 2000216618 | 4/2000 |
| JP | 2001177458 A | 6/2001 |
| JP | 2002141730 A | 5/2002 |
| JP | 2002530998 | 9/2002 |
| JP | 3332911 | 10/2002 |
| JP | 2003092508 | 3/2003 |
| JP | 2003264492 | 9/2003 |
| JP | 2003309513 | 10/2003 |
| JP | 2004-304586 | 10/2004 |
| JP | 2004-343468 | 12/2004 |
| JP | 2006512807 | 4/2006 |
| KR | 20010076252 | 8/2001 |
| KR | 20010110464 | 12/2001 |
| KR | 1020020022109 | 3/2002 |
| KR | 20020026605 | 4/2002 |
| KR | 200289094 | 11/2002 |
| KR | 100584625 | 5/2006 |
| WO | 9914870 | 3/1999 |
| WO | 9957820 A | 11/1999 |
| WO | WO0031892 A1 | 6/2000 |
| WO | 0119101 | 3/2001 |
| WO | 0211237 | 2/2002 |
| WO | 02078209 | 10/2002 |
| WO | 2004039022 A | 5/2004 |
| WO | WO2004038952 | 5/2004 |
| WO | WO2004039011 A2 | 5/2004 |
| WO | WO2005081483 | 9/2005 |
| WO | 2006116453 A | 11/2006 |

OTHER PUBLICATIONS

Written Opinion-PCT/US2006/060502. International Search Authority-European Patent Office-May 24, 2007.

International Preliminary Report on Patentability-PCT/US2006/060502, International Bureau of WIPO-Geneva, Switzerland-May 6, 2008.

Taiwan Search Report—TW095140593—TIPO—Mar. 31, 2011.

* cited by examiner

ANTENNA ARRAY CALIBRATION FOR MULTI-INPUT MULTI-OUTPUT WIRELESS COMMUNICATION SYSTEMS

CLAIM OF PRIORITY UNDER 35 U.S.C. §119 AND §120

This application claims benefit under 35 U.S.C. §119(e) from U.S. Provisional Patent application Ser. No. 60/733,021 entitled "ANTENNA ARRAY CALIBRATION FOR MULTI-INPUT MULTI-OUTPUT WIRELESS COMMUNICATION SYSTEMS", filed Nov. 2, 2005, and also claims benefit under 35 U.S.C. §120 to Application Ser. No. 11/398,077 entitled "ANTENNA ARRAY CALIBRATION FOR WIRELESS COMMUNICATION SYSTEMS", filed Apr. 4, 2006, both assigned to the assignee hereof and hereby expressly incorporated by reference herein.

REFERENCE TO CO-PENDING APPLICATIONS FOR PATENT

The present Application for Patent is related to the following co-pending U.S. Patent Application: "ANTENNA ARRAY CALIBRATION FOR WIRELESS COMMUNICATION SYSTEMS" by Ayman Fawzy Naguib, Alexei Gorokhov and Rajiv Vijayan, Ser. No. 11/405,832, filed concurrently herewith, assigned to the assignee hereof, and expressly incorporated by reference herein.

BACKGROUND

I. Field

The following description relates generally to wireless communications, and, amongst other things, to calibrating an antenna array for multi-input multi-output wireless communication systems.

II. Background

Wireless networking systems have become a prevalent means by which a majority of people worldwide has come to communicate. Wireless communication devices have become smaller and more powerful in order to meet consumer needs and to improve portability and convenience. The increase in processing power in mobile devices such as cellular telephones has lead to an increase in demands on wireless network transmission systems. Such systems typically are not as easily updated as the cellular devices that communicate there over. As mobile device capabilities expand, it can be difficult to maintain an older wireless network system in a manner that facilitates fully exploiting new and improved wireless device capabilities.

More particularly, frequency division based techniques typically separate the spectrum into distinct channels by splitting it into uniform chunks of bandwidth, for example, division of the frequency band allocated for wireless cellular telephone communication can be split into channels, each of which can carry a voice conversation or, with digital service, carry digital data. Each channel can be assigned to only one user at a time. One commonly utilized variant is an orthogonal frequency division technique that effectively partitions the overall system bandwidth into multiple orthogonal subbands. These subbands are also referred to as tones, carriers, subcarriers, bins, and/or frequency channels. Each subband is associated with a subcarrier that can be modulated with data. With time division based techniques, a band is split time-wise into sequential time slices or time slots. Each user of a channel is provided with a time slice for transmitting and receiving information in a round-robin manner. For example, at any given time t, a user is provided access to the channel for a short burst. Then, access switches to another user who is provided with a short burst of time for transmitting and receiving information. The cycle of "taking turns" continues, and eventually each user is provided with multiple transmission and reception bursts.

Code division based techniques typically transmit data over a number of frequencies available at any time in a range. In general, data is digitized and spread over available bandwidth, wherein multiple users can be overlaid on the channel and respective users can be assigned a unique sequence code. Users can transmit in the same wide-band chunk of spectrum, wherein each user's signal is spread over the entire bandwidth by its respective unique spreading code. This technique can provide for sharing, wherein one or more users can concurrently transmit and receive. Such sharing can be achieved through spread spectrum digital modulation, wherein a user's stream of bits is encoded and spread across a very wide channel in a pseudo-random fashion. The receiver is designed to recognize the associated unique sequence code and undo the randomization in order to collect the bits for a particular user in a coherent manner.

A known type of communication system is a multi-input multi-output (MIMO) communication system where both the transmitter and the receiver have a plurality of receive and transmit antennas for communication. A mobile terminal, with multiple receive and transmit antennas, within the coverage area of a base station with multiple receive and transmit antennas, can be interested in receiving one, more than one or all the data streams from the base station. Likewise, a mobile terminal can transmit data to the base station or another mobile terminal. Such communication between base station and mobile terminal or between mobile terminals can be degraded due to channel variations and/or interference power variations. For example, the aforementioned variations can affect base station scheduling, power control and/or rate prediction for one or more mobile terminals.

When antenna arrays and/or base stations are employed in conjunction with a time domain duplexed (TDD) channel transmission technique, very large gains can be realized. A key assumption in realizing these gains is that due to the TDD nature of the transmission and reception, both the forward link (FL) and reverse link (RL) observe similar physical propagation channels corresponding to a common carrier frequency. However, in practice the overall transmit and receive chains, which can include the analog front ends and the digital sampling transmitters and receivers, as well as the physical cabling and antenna architecture, contribute to the over all channel response experienced by the receiver. In other words, the receiver will see an overall or equivalent channel between the input of the transmitter digital to analog converter (DAC) and the output of the receiver analog to digital converter (ADC), which can comprise the analog chain of the transmitter, the physical propagation channel, the physical antenna array structure (including cabling), and the analog receiver chain.

In view of at least the above, there exists a need in the art for a system and/or methodology of calibrating antenna arrays employed in wireless communication devices.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

According to an aspect, a method of calibrating an antenna array in a wireless network comprises determining channel estimates for at least two antennas of at least two access terminals and determining a calibration ratio based upon each of the channel estimates for the at least two antennas.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
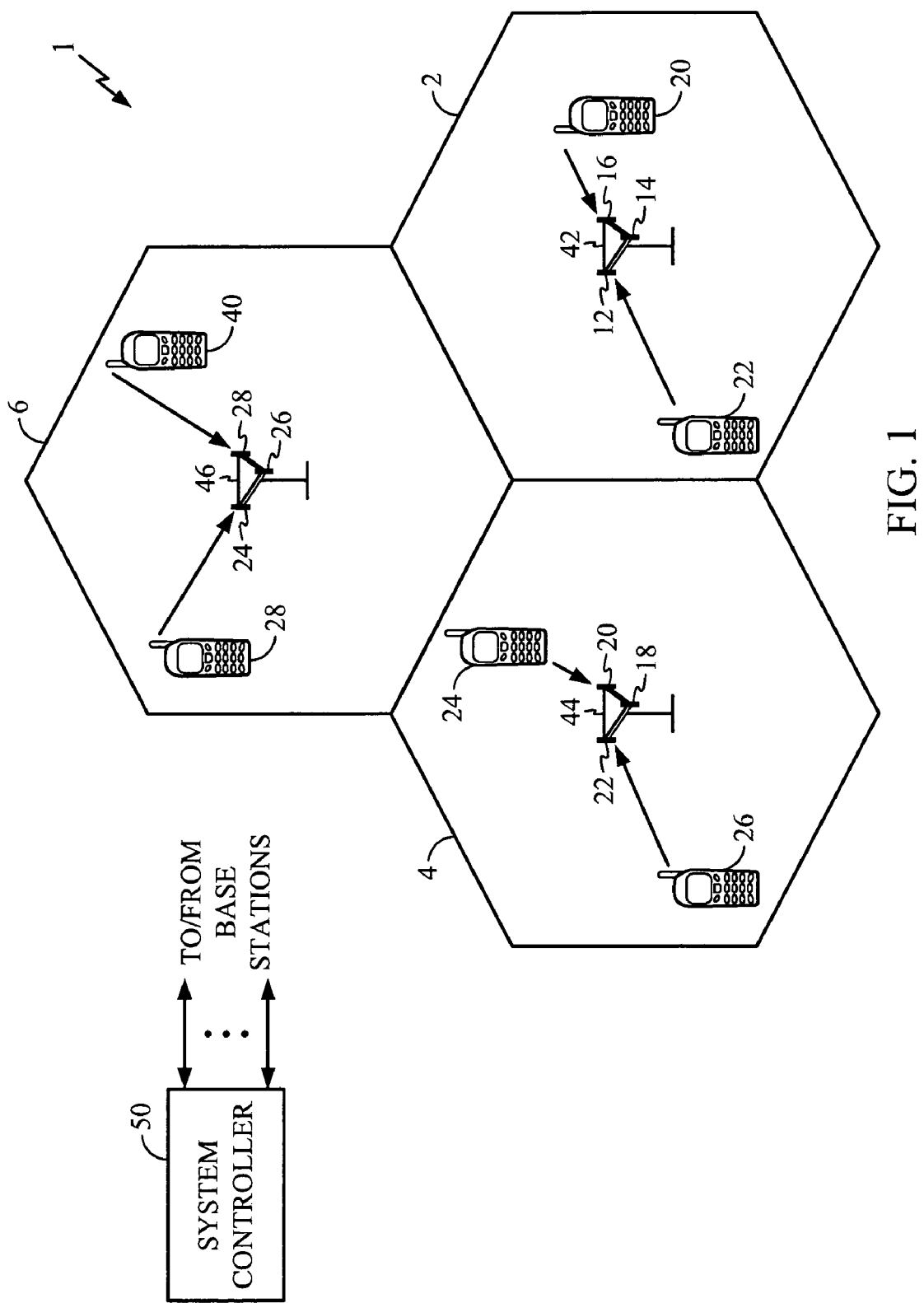
FIG. 1 illustrates aspects of a multiple access wireless communication system

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. One or more components may reside within a process and/or thread of execution and a component may be localized on one computer and/or distributed between two or more computers. Also, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a subscriber station. A subscriber station can also be called a system, a subscriber unit, mobile station, mobile, remote station, access point, base station, remote terminal, access terminal, user terminal, user agent, user equipment, etc. A subscriber station may be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, flash memory devices (e.g., card, stick, key drive . . . ), and integrated circuits such as read only memories, programmable read only memories, and electrically erasable programmable read only memories.

Referring to FIG. 1, a multiple access wireless communication system according to one embodiment is illustrated. A multiple access wireless communication system 1 includes multiple cells, e.g. cells 2, 104, and 106. In FIG. 1, each cell 2, 4, and 6 may include an access point that includes multiple sectors. The multiple sectors are formed by groups of antennas each responsible for communication with access terminals in a portion of the cell. In cell 2, antenna groups 12, 14, and 16 each correspond to a different sector. In cell 4, antenna groups 18, 20, and 22 each correspond to a different sector. In cell 6, antenna groups 24, 26, and 28 each correspond to a different sector.

Each cell includes several access terminals which are in communication with one or more sectors of each access point. For example, access terminals 30 and 32 are in communication with access point base 42, access terminals 34 and 36 are in communication with access point 44, and access terminals 38 and 40 are in communication with access point 46.

Controller 50 is coupled to each of the cells 2, 4, and 6. Controller 50 may contain one or more connections to multiple networks, e.g. the Internet, other packet based networks, or circuit switched voice networks that provide information to, and from, the access terminals in communication with the cells of the multiple access wireless communication system 1. The controller 50 includes, or is coupled with, a scheduler that schedules transmission from and to access terminals. In other embodiments, the scheduler may reside in each individual cell, each sector of a cell, or a combination thereof.

In order to facilitate calibration of transmissions to the access terminals, it is helpful to calibrate the access point gain calibration loop to deal with mismatches due to the transmit and receive chains of the access point. However, due to the noise in the channel, any calibration estimates based on the signals received at the access terminals, forward link, and transmitted from the access terminals, reverse link, may contain noise and other channel variations that may call into question the estimates provided. In order to overcome the channel noise effects, multiple calibrations on both the forward link and reverse link are utilized for multiple access terminals. In certain aspects, multiple transmissions to and from each antenna of each access terminal are taken into account to perform calibration of a given sector. In certain aspects, the multiple antennas may be used to calibrate communication for a single access terminal. In other aspects, one or less than all of the antennas for a group of access terminals may be utilized for communication with all of the antennas for the group of access terminals.

In certain aspects, either the transmit chain of the access point or receive chain of the access point may be calibrated. This may be done, for example, by utilizing a calibration ratio to calibrate the receive chain of the access point to its transmit chain or calibrate its transmit chain to its receive chain.

In the case of a MIMO system, each antenna of each access terminal may be treated as a separate access terminal for the purposes of determining a calibration ration. Then when the calibration ratios are combined, each separate calibration ratio or calibration information for each antenna of each access terminal may be utilized as a separate component.

As used herein, an access point may be a fixed station used for communicating with the terminals and may also be referred to as, and include some or all the functionality of, a base station, a Node B, or some other terminology. An access terminal may also be referred to as, and include some or all the functionality of, a user equipment (UE), a wireless communication device, terminal, a mobile station or some other terminology.

It should be noted that while FIG. 1, depicts physical sectors, i.e. having different antenna groups for different sectors, other approaches may be utilized. For example, utilizing multiple fixed "beams" that each cover different areas of the cell in frequency space may be utilized in lieu of, or in combination with physical sectors. Such an approach is depicted and disclosed in copending U.S. patent application Ser. No. 11/260,895, entitled "Adaptive Sectorization In Cellular System," which is incorporated herein by reference.

Figure 2:
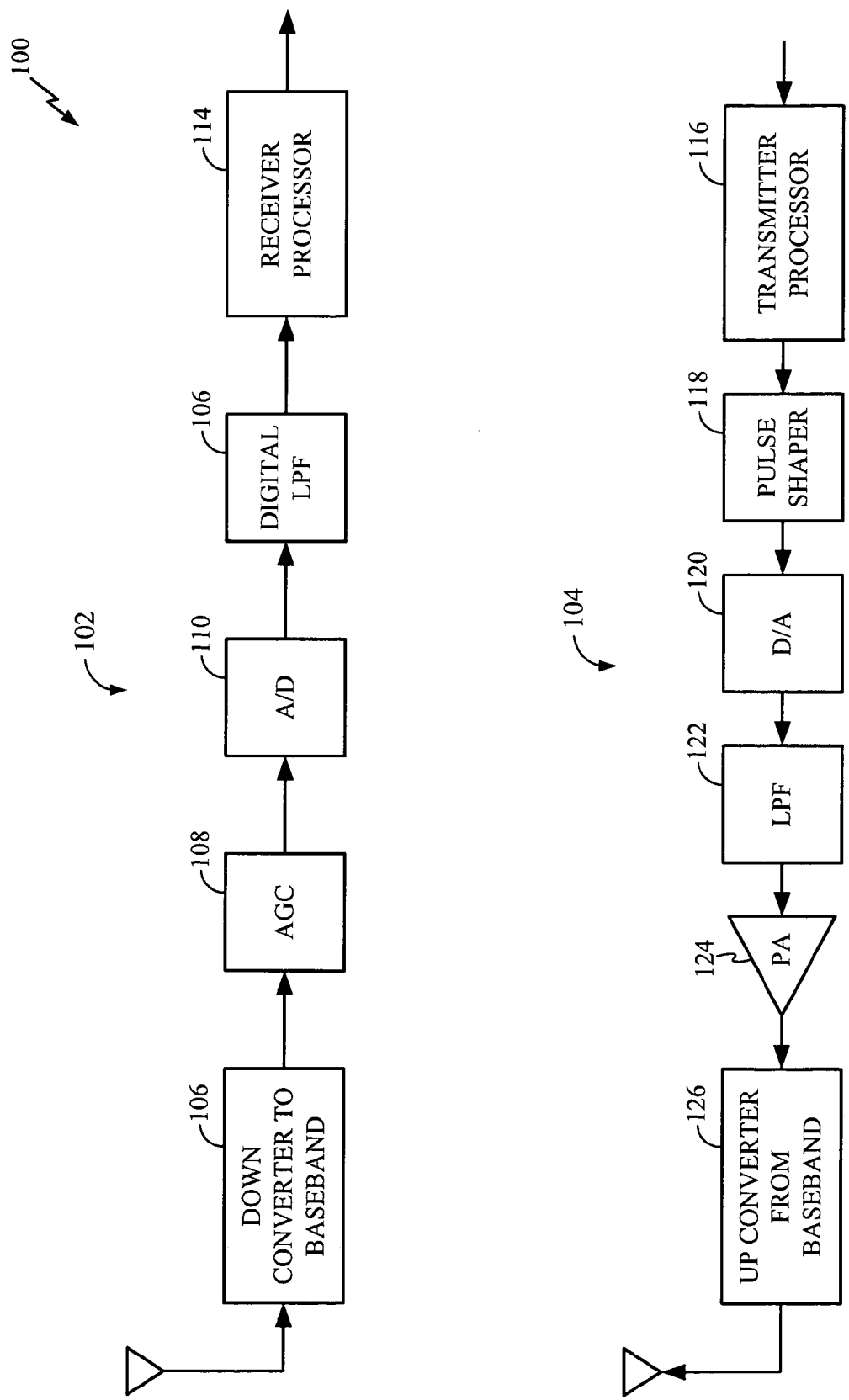
FIG. 2 illustrates an antenna arrangement comprising a receiver chain and a transmitter chain in accordance with various aspects described herein.

Referring to FIG. 2, an antenna arrangement 100 comprising a receiver chain 102 and a transmitter chain 104 in accordance with various aspects described herein. Receiver chain 102 comprises a down converter component 106 that down converts a signal to a baseband upon receipt. Down converter component 106 is operatively connected to an automatic gain control (AGC) functionality 108 that assesses received signal strength and automatically adjusts a gain applied to the received signal to maintain receiver chain 102 within its associated linear operation range and to provide a constant signal strength for outputting through transmitter chain 104. It will be appreciated that AGC 108 can be optional to some embodiments described herein (e.g., automatic gain control need not be performed in conjunction with every embodiment). AGC 108 is operatively coupled to an analog-to-digital (A/D) converter 110 that converts the received signal to digital format before the signal is smoothed by a digital low-pass-filter (LPF) 112 that can mitigate short-term oscillations in the received signal. Finally, receiver chain 102 can comprise a receiver processor 114 that processes the received signal and can communicate the signal to one or more components of transmitter chain 104.

Transmitter chain 104 can comprise a transmitter processor 116 that receives a signal from receiver chain 102 (e.g., transmitter receives a signal that was originally received by receiver chain 102 and subjected to various processes associated with the components thereof, . . . ). Transmitter processor 116 is operatively coupled to a pulse shaper 118 that can facilitate manipulating a signal to be transmitted such that the signal can be shaped to be within bandwidth constraints while mitigating and/or eliminating inter-symbol interference. Once shaped, the signal can undergo digital-to-analog (D/A) conversion by a D/A converter 120 before being subjected to an operatively associated low-pass filter (LPF) 122 in transmitter chain 104 for smoothing. A pulse amplifier (PA) component 124 can amplify the pulse/signal before up-conversion to the baseband by an up-converter 126.

Antenna array 100 may exist for each antenna of both an access point and access terminal. As such, there may be a noticeable difference observed between transfer characteristics of transmitter chain 104 and receiver chain 102 and/or samples thereof, reciprocity of the equivalent channel and/or transmitter/receiver variations may not be assumed. When calibrating an array of antennas 100, an understanding of the magnitude of variations, in terms of the effects on the phase and/or amplitude, of signals propagated along the transmitter and receiver chains and their influence on the accuracy of a reciprocity assumption may be utilized in order to facilitate the calibration process. Furthermore, in the case of an antenna array, generally each antenna 100 has a different transmitter chain 104 and a receiver chain 102 than each other antenna. Therefore, each different transmitter chain 104 may have different effects, in terms of phase and/or amplitude, as any other transmitter chain 104, respectively. The same can be true for receiver chains 102 of each antenna 100.

The mismatches in the effects can be due to the physical structure of the antenna 100, component differences, or a number of other factors. Such mismatches can include, for example, mutual coupling effects, tower effects, imperfect knowledge of element locations, amplitude and/or phase mismatches due to antenna cabling, and the like. Additionally, mismatches can be due to hardware elements in transmitter chain 104 and/or receiver chain 102 of each antenna 100. For example, such mismatches can be associated with analog filters, I and Q imbalance, phase and/or gain mismatch of a low-noise amplifier or a pulse amplifier in the chains, various non-linearity effects, etc.

For an access point, to calibrate each transmit chain to its corresponding receive chain (i.e. the receive chain corresponding to the same antenna) independently would require a complex and potentially unwieldy process. Further, any specific feedback, for forward link transmission, or pilots, used for reverse link transmission, for any given access terminal is subject to the noise for that user. Therefore, for any given calibration ratio estimated based on both the forward and reverse links, there is some error introduced by the channel variation and noise. Therefore, in several aspects, one or more calibration ratios estimated for a number of different antennas of different access terminals are combined in order to obtain a single calibration ratio to be used by the access point for transmission to one or all of the access terminals. In certain aspects, the combination may constitute an average of all of the calibration ratios for each antenna of each access terminal communicating with the access point, or some predetermined subset. In another aspect, the combination may be done in a joint optimization fashion where the channel measurements from and for each antenna of each access terminal are combined to estimate a single calibration ratio that is a combination of the gain mismatches for each antenna of each access terminal, without calculating an individual calibration ratio for each antenna of each access terminal.

For any given antenna of each access terminal, the access point uses its reverse link channel estimates for that antenna as well as the forward link channel estimates, which are performed at the access terminal and fed back to the access point, in order to estimate or calculate the calibration ratio, based on that antenna of that access terminal.

A forward link channel estimate, $\hat{h}_{AT}^{(i)}$, may be estimated at the access terminal for transmissions from the access point's i-th transmit antenna to the antenna of the access terminal. However, any channel estimate will have components related to the noise of the channel, along with any gain or distortion caused by the access points transmit chain and the access terminals receive chain. The forward link channel estimate may then be written as:

$$\underbrace{\hat{h}_{AT}^{(i)}}_{} = \underbrace{\beta_{AT}}_{\text{AT receive chain gain mismatch}} \cdot \underbrace{\alpha_{AP}^{(i)}}_{\text{AP transmit chain gain mismatch}} \cdot \underbrace{h_i}_{\text{Physical channel}} + \underbrace{n_i}_{\text{Measurement noise}} \quad (1)$$

In Equation 1, channel estimate is a function of the gain mismatch $\beta_{AT}$ of the access terminal receiver chain for the particular antenna, the gain mismatch $\alpha_{Ap}^{(i)}$ of the transmitter chain of the access point, $h_i$ which is the physical channel between the two antennas being measured, and the noise $n_i$ of the channel that is part of the channel estimate.

In the case of reverse link transmissions, the channel estimate at the access point's i-th receive antenna due to transmission from the antenna of the access terminal $\hat{h}_{AP}^{(i)}$ is essentially an inverse of Equation 1. This can be seen in Equation 2 below:

$$\underbrace{\hat{h}_{AP}^{(i)}}_{} = \underbrace{\alpha_{AT}}_{\text{AT transmit chain}} \cdot \underbrace{\beta_{AP}^{(i)}}_{\text{AP receive chain gain mismatch}} \cdot \underbrace{h_i}_{\text{Physical channel}} + \underbrace{\upsilon_i}_{\text{Measurement noise}} \quad (2)$$

In Equation 2, this channel estimate is a function of the gain mismatch $\alpha_{AT}$ of the access terminal transmit chain for that antenna, the gain mismatch $\beta_{Ap}^{(i)}$ of the access point receiver chain, $h_i$ which is the physical channel between the two antennas being measured, and the noise $\upsilon_i$ of the channel that is part of the channel estimate.

In order to calibrate the antenna array the mismatch errors between receiver chains 102 and transmitter chains 104 of the antennas 100 therein is shown below in Equation 3. It should be noted that other methodologies and mathematical relationships may be employed to achieve array calibration in conjunction with, in lieu of, the methodologies and mathematical relationships described herein.

$$c_i = \frac{\hat{h}_{AP}^{(i)}}{\hat{h}_{AT}^{(i)}} \quad (3)$$

$$= \frac{\alpha_{AT}}{\beta_{AT}} \cdot \frac{\beta_{AP}^{(i)}}{\alpha_{AP}^{(i)}}$$

$$= \gamma \cdot \frac{\beta_{AP}^{(i)}}{\alpha_{AP}^{(i)}}$$

$$= \gamma \cdot \eta_i$$

In Equation 3, $c_i$ is the overall mismatch ration between reverse link transmissions and forward link transmission, $\gamma$ is the mismatch ratio of the gains between transmit and receive chains of the access terminal for the particular antenna, and $\eta_{i\ is}$ the mismatch ratio of the receive and transmit chains for the ith antenna at the access point. It should be noted that $\gamma$ is substantially constant for each antenna pair at the access point. Also, in some regards Equation 3 is idealized, as the noise estimate is not included therein.

The calibration ratios $c_i$, i=1, . . . , M , where M is the number of antennas in the access point antenna array can be grouped into one vector $\tilde{c}$, for each antenna at the access terminal, which may be termed a "calibration vector."

$$\tilde{c} = \begin{bmatrix} \tilde{c}_1 \\ \tilde{c}_2 \\ \vdots \\ \tilde{c}_M \end{bmatrix} = \gamma \cdot \begin{bmatrix} \eta_1 \\ \eta_2 \\ \vdots \\ \eta_M \end{bmatrix} + \begin{bmatrix} z_1 \\ z_2 \\ \vdots \\ z_M \end{bmatrix} = \gamma \cdot \eta + n \quad (4)$$

In Equation 4, the entries of vector $\tilde{c}$ correspond to the estimates for each antenna of the access point with respect to a single antenna of an access terminal. It should be noted that the elements of vector $\hat{c}$ may be complex numbers including both the amplitude and phase mismatch for each transmit and receive chains of the access point antenna array as well as common mismatch corresponding to the transmit and receive mismatch of the access terminal transmit and receive chains for the particular antenna. It should be noted that while Equation 4, describes a vector that has entries for one access terminal antennas, it may include entries for multiple access terminals or multiple antennas of an access terminal.

The noise vector n includes effects of channel measurement errors (MSE) and also the effects of channel measurement de-correlation, since the measurements of the gains are performed at different times thus allowing channel variation over time as well as temperature and other variations to effect the measurement.

An estimated calibration vector $\tilde{c}_u$ corresponding to access terminal u , may be determined as shown below in Equation 5.

$$\tilde{c}_u = \gamma_u \cdot \eta \quad (5)$$

where $\gamma_u$ is the gain mismatch corresponding to the access terminal antenna's transmit and receive chains and $\eta$ is the mismatch vector corresponding to the access point antenna array transmit and receive chains. The vector $\tilde{c}_u$ is determine for all of the antennas of the access point antenna array with respect to each antenna of each access terminal.

In the above it should be noted that there are several methods to combine different calibration vector estimates (corresponding to measurements from different antenna's of different access terminals) to generate an overall or combined calibration vector. One way to do this combination is to average all the calibration vector estimates to obtain a single estimate.

In this approach, each calibration vector estimate includes a multiplicative factor, $\gamma_u$, which is different for different access terminals. In a case where one or more access terminals have a very large gain mismatch $\gamma_u$, simple averaging may lead to results s bias the average toward the antenna's having the largest gain mismatch $\gamma_u$.

In another aspect, each calibration vector estimate, corresponding to a specific access terminal, is normalized according to an element of the vector. This may provide minimization in those cases where one or more access terminals have high gain mismatch $\gamma_u$. This process is depicted below in Equation 6.

$$\tilde{c}_u = \frac{\hat{c}_u}{\hat{c}_{u,1}}, \tilde{c} = \frac{1}{U}\sum_{u=1}^{U}\tilde{c}_u \qquad (6)$$

It should be noted that, in certain aspects, the normalizing element may be any element of the calibration vector, as long as it is the same element for each calibration vector estimate, e.g. the first element. The sum of the normalized elements is then divided by the total number of elements U of the vector $\tilde{c}$.

Another approach that may be utilized to combine different calibration vector estimates may be based upon combining the estimated vectors in a matrix. For instance, in certain aspects, it may that that each calibration vector estimate is a rotated and scaled version of the same vector $\eta$ and the rotation and scaling are due to the different mismatches $\gamma_u$ for the different access terminals. One way to get rid of this scaling and rotation is to first normalize each calibration vector to have a unit norm. Then, a matrix Q whose columns are the normalized calibration vector estimates may be formed from the calibration vectors. A single estimate for the calibration vector is obtained by performing a decomposition of the matrix, e.g. a singular value decomposition on the matrix Q. The eigenvector corresponding to the maximum singular value may be used as the overall calibration vector estimate, e.g. as shown in Equation (7) below.

$$Q = [\hat{c}_1 \quad \hat{c}_2 \quad \cdots \quad \hat{c}_U], \hat{c}_j = \frac{\hat{c}_j}{\|\hat{c}_j\|} \quad j = 1, \ldots, U \qquad (7)$$

$$SVD(Q) = U \cdot S \cdot V$$

As exemplified in the three approaches above, a calibration ratio is generally estimated in two steps. First, values corresponding to the elements of calibration vectors are calculated for the antenna array, or those antennas of interest. The calibration vectors are then combined according to one or more different mathematical processes.

An alternative to calculating multiple calibration vectors is to utilize a joint optimization procedure using multiple access point and access measurement as follows. In some cases, the access terminal antennas and access point may generate their channel estimates for different frequency tones and at different time instants. Further, there may be a timing error of $\tau_{k,u}$ a between the access point and the u-th access terminal at time k. In such a case, the forward link channel vector estimate $g_{i,k,u}$ measured at the antenna of the access terminal may be related to the reverse link channel vector estimate $h_{i,k,u}$ measured at the access point. One approach, utilizing the calibration vector $\eta$, and the mismatch $\gamma_u$ of the access terminal antenna is depicted in Equation 8 below.

$$g_{i,k,u} = \gamma_u \cdot e^{-j\omega_i \tau_u} \cdot diag(h_{i,k,u}) \cdot \eta + n_{i,k,u} \qquad (8)$$
$$= \gamma_{i,k,u} \cdot Z_{i,k,u} \cdot \eta + n_{i,k,u}$$

In Equation 8, $Z_{i,k,u}$ is a diagonal matrix whose diagonal elements are the elements of the reverse link channel vector estimate $h_{i,k,u}$ and $\gamma_{i,u} = \gamma_u \cdot e^{-j\omega_i \tau_u}$. The subscripts i, k, u, are the tone, time, and user indexes, respectively. In the above equation, the unknowns are the calibration vector $\eta$ and the access terminal specific mismatch $\gamma_{i,k,u}$. A feature of Equation 8 is that access terminal mismatch includes the effect of the timing mismatch between the access point and the antenna of the access terminal in addition to the gain mismatch due to the access terminal transmit and receive chains for that antenna. One way to obtain a solution for $\eta$ and $\gamma_{i,k,u}$ is to utilize a minimum mean squared error (MMSE) approach as shown in Equation 9.

$$\rho \Box \sum_{i,k,u} \|\bar{y}_{i,k,u} \cdot g_{i,k,u} - Z_{i,k,u} \cdot \eta\|^2 \qquad (9)$$

$$\{\eta, \bar{y}_{i,k,u}\} = \underset{\eta, \bar{y}_{i,k,u}}{\arg\min} \rho_u(\eta, \bar{y}_{i,k,u}) s.t. \|\eta\| = 1$$

Solutions for $\eta$ and $\gamma_{i,k,u}$ may be given by Equation 10 below. $\eta \Box$ minimal eigenvector of $$F = \sum_u F_u = \sum_{i,k,u} Z^*_{i,k,u} \cdot \prod_{g_{i,k,u}}^{\perp} \cdot Z_{i,k,u} \qquad (10)$$

$$\gamma_{i,k,u} = \frac{g^*_{i,k,u} - Z_{i,k,u} \cdot \eta}{g^*_{i,k,u} g_{i,k,u}}$$

where, for a vector x, the orthogonal projection operator $\Pi_x^{\perp}$ may be defined as $$\prod_x^{\perp} = I - \frac{xx^*}{x^*x} \qquad (11)$$

To compensate for the mismatches, the calibration ratios may be used to alter the gain, in terms of both, or either, the phase and amplitude of the transmitter chain of the access point to match it to its receiver chain or equivalently to alter the gain of the receive chain of the access point to match it to its transmit chain.

More specifically, the access point may use maximal ratio combining (MRC) beamforming, equal gain combining (EGC) beamforming, or any other spatial pre-processing techniques for transmission to any access terminal. That is, if the reverse link channel vector is h, the access point uses the following pre-processing weights for transmission:

$$w_{MRC}(h) = h^*/|h|, \qquad |h| = \sqrt{h^* \cdot h} \quad \text{for MRC} \qquad (12)$$

$$w_{EGC}(h) = \frac{1}{\sqrt{M}} \exp(-j\varphi_h), \qquad \varphi_h = \Box h \quad \text{for EGC}$$

With a calibration vector estimate $\eta$, the access point may uses the following pre-processing weights to compensate for its transmit and receive chain mismatches:

$$w_{MRC} = diag(\eta) \cdot h^*/|h|, \qquad |h| = \sqrt{h^* \cdot h} \quad \text{for MRC} \qquad (13)$$

$$w_{EGC} = diag(\eta_\phi) \cdot \frac{1}{\sqrt{M}} \exp(-j\varphi_h), \qquad \varphi_h = \Box h \quad \text{for EGC}$$

where $diag(\eta_\phi) = diag((\Box \eta)$.

While FIG. 2, depicts and describes one embodiment of receiver chain 102 and transmitter chain 104 other layouts and structures may be utilized. For example, a different number of components may be used in both receiver chain 102 and transmitter chain 104. Additionally, different devices and structures may also be substituted.

It should be noted that the combined or joint calibration vectors may be formed by treating each antenna, or group of antennas, of a given access terminal as a separate access terminal. In that way, the calibration process may be simplified and each access terminal need not be calibrated independently.

Figure 3:
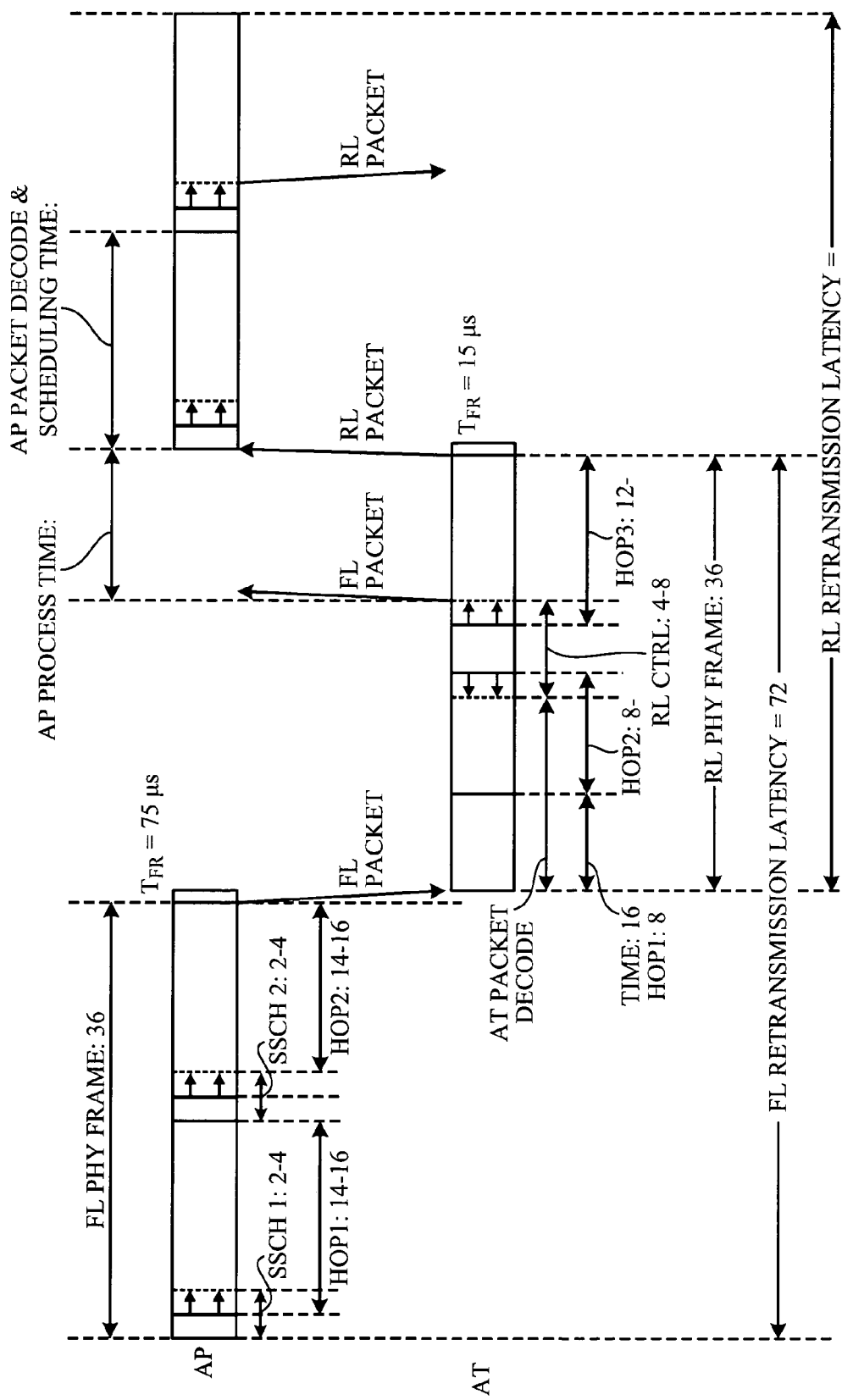
FIG. 3 illustrates aspects timing for calibration operations.

FIG. 3 illustrates a timing cycle for a calibration from a single access terminal, where a TDD system having a single forward link frame or burst adjacent to a single reverse link frame or burst is utilized. As can be seen, one or more pilots transmitted, from each of the antennas, on the reverse link is(are) measured at the access point. The time period of the measurement is a function of the decoding time of the access point. During this decoding period one or more pilots are transmitted on the forward link to the access terminal. The access terminal then measures the pilots to estimate the forward link channel for each receive antenna. As with the reverse link estimates, some decoding lag exists. The decoded forward link estimates need to be transmitted back to the access point in order to generate the calibration ratio. Therefore, it can be seen that there is some minimum amount of time, and therefore maximum access terminal velocity, for which calibration can be maintained without drift being a strong or substantially interfering factor.

As can be seen from FIG. 3, if multiple channel estimates from multiple access terminals are utilized the noise and drift associated may be reduced or at least sampled over a range of times and receive chains. Further, if multiple antennas for each access terminal is utilized and treated independently the drift and noise may be better estimated since the noise and drift may be more uniform for those antennas for a single access terminal thus mitigating any anomalies for a given antenna.

Figure 4:
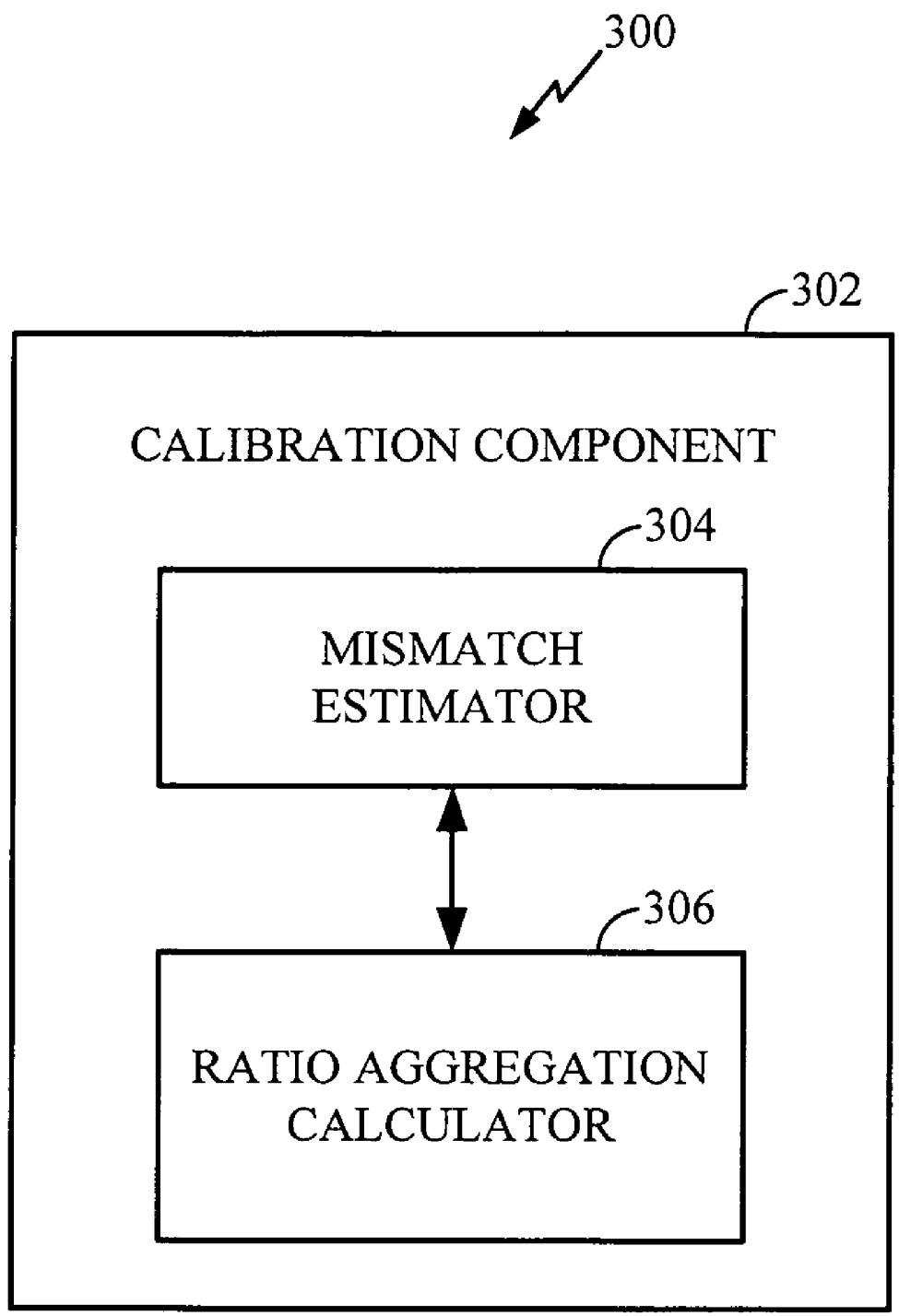
FIG. 4 illustrates aspects of logic that facilitates calibrating an antenna array to compensate for gain mismatch.

FIG. 4 illustrates aspects of logic that facilitates calibrating an antenna array to compensate for gain mismatch. The system 300 comprises a calibration component 302 that includes a mismatch estimation component 304 that analyzes models receiver chain output signals and/or comparisons between receiver chain output signals and a ratio aggregation calculator 306 that calculates ratios that are used to generate vector $\eta$ and aggregates them for use using one of the methods described above to combine different measurements from different antennas of different access terminals.

Figure 5:
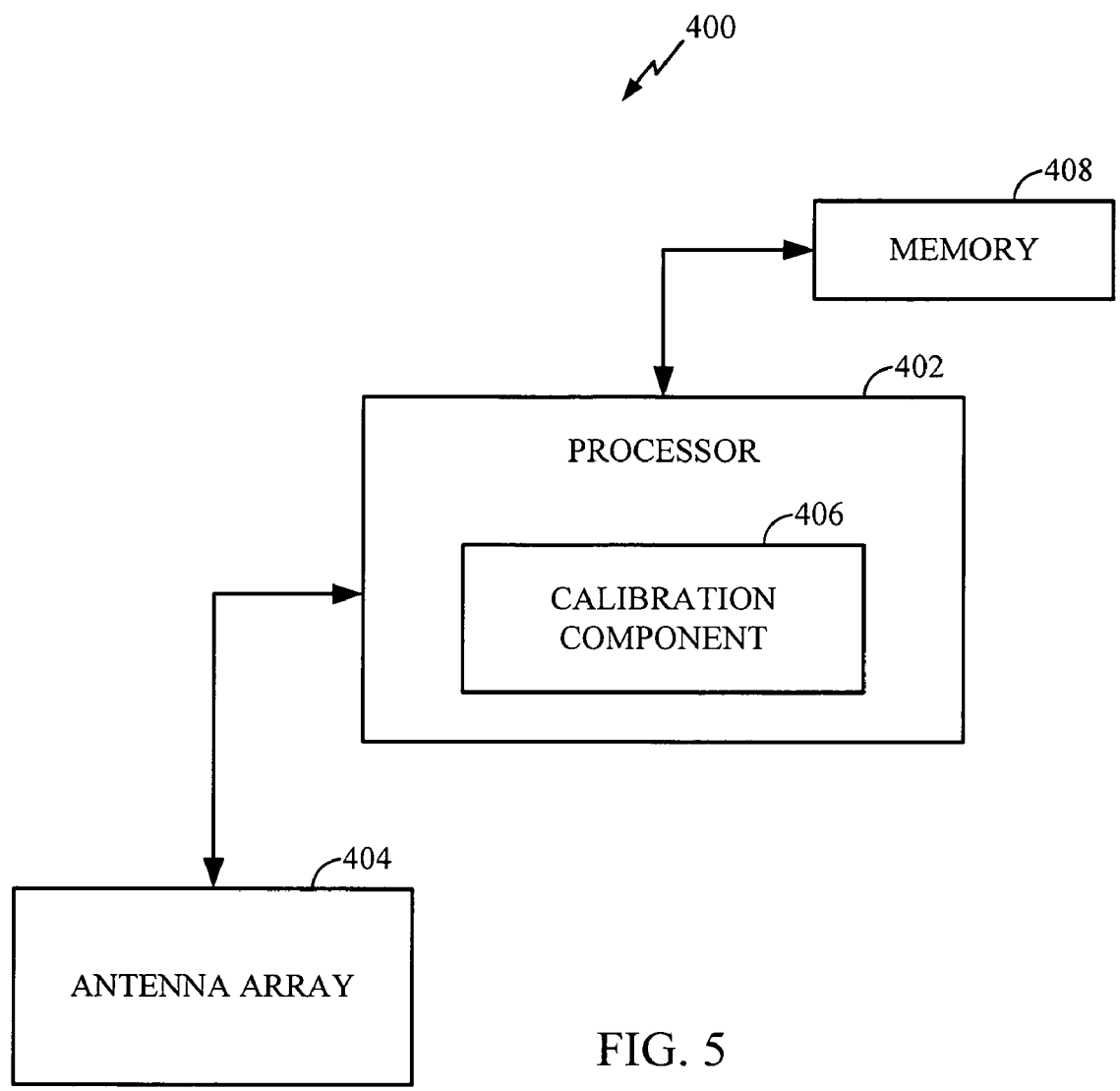
FIG. 5 illustrates aspects of a system that facilitates calibrating an antenna array to compensate for gain mismatch.

FIG. 5 illustrates aspects of a system that facilitates calibrating an antenna array to compensate for gain mismatch. The system 400 comprises a processor 402 that is operatively coupled to an antenna array 404. Processor 402 can determine gain mismatches for individual antenna combinations at the access terminal and access point utilizing calibration component 406. Processor 402 further comprises a calibration component 406 that determines the calibration ratios and then generates and utilizes the vector $\eta$.

System 400 can additionally comprise memory 408 that is operatively coupled to processor 402 and that stores information related to array calibration, ratio generation and utilization, and generating calibration data, etc., and any other suitable information related to calibrating antenna array 404. It is to be appreciated that processor 402 can be a processor dedicated to analyzing and/or generating information received by processor 402, a processor that controls one or more components of system 400, and/or a processor that both analyzes and generates information received by processor 402 and controls one or more components of system 400.

Memory 408 can additionally store protocols associated with generating signal copies and models/representations, mismatch estimations, etc., such that system 400 can employ stored protocols and/or algorithms to achieve antenna calibration and/or mismatch compensation as described herein. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 408 of the subject systems and methods is intended to comprise, without being limited to, these and any other suitable types of memory.

In certain aspects, memory 408 can store the calibration vectors $\tilde{c}_u$ for each state, i.e. level of amplification, of the AGC. In such aspects, for each transmission, the processor 402 may access the calibration vector $\tilde{c}_u$ for the AGC state without performing a calibration. The decision as to whether to perform an additional calibration or access a prior calibration vector $\tilde{c}_u$ for a give transmission may be based upon a time period or number of transmissions since the calibration vector $\tilde{c}_u$ for the AGC state was obtained. This may be system parameter or may vary based upon channel conditions, e.g. loading of the channel.

Figure 6:
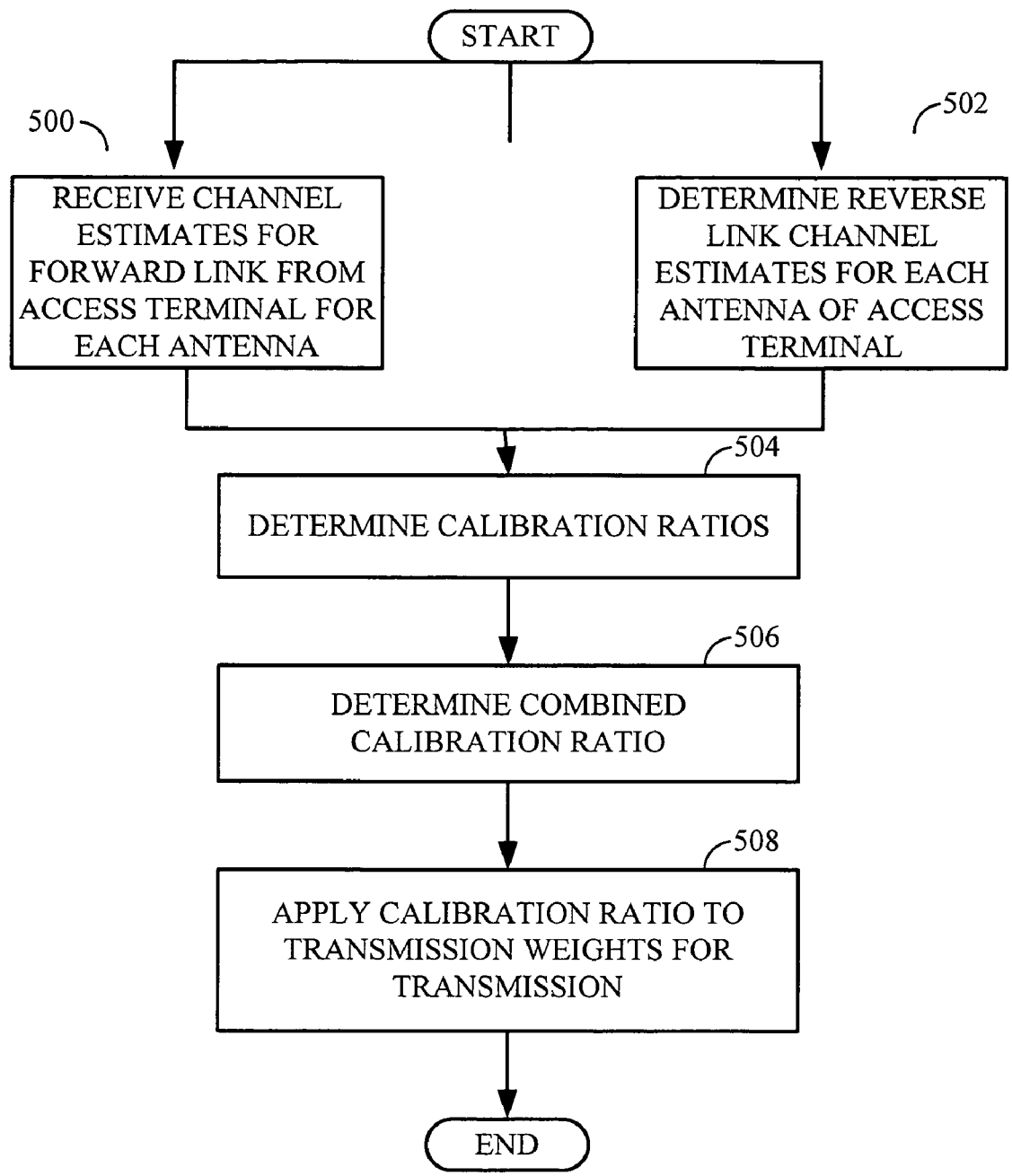
FIG. 6 illustrates aspects of a methodology for calibrating an array of antennas.

Referring to FIG. 6, a methodology relating to generating supplemental system resource assignments are illustrated. For example, methodologies can relate to antenna array calibration in a TDMA environment, an OFDM environment, an OFDMA environment, a CDMA environment, or any other suitable wireless environment. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

FIG. 6 illustrates a methodology for calibrating an array of antennas for transmission. Channel estimates for the forward link are received from access terminals for each of the receive antennas of the access terminal, block 500. As discussed above, these channel estimates may be generated from forward link pilots transmitted by the access point. Additionally, channel estimates for the reverse link information, e.g. reverse link channel pilots, are generated by the access point for each transmit antenna of the access terminal, block 502.

After both forward link and reverse link channel estimates are collected, calibration ratios for each access terminal antenna and access point antenna may be determined, block 504. In certain aspects, the most recent forward link and reverse link channel estimate with respect to each other in time is utilized to form a calibration ratio. In such cases, multiple estimates for a given access terminal may be performed based upon consecutive channel estimate pairs of forward link and reverse link estimates.

As discussed with respect to FIG. 3, there may be some time lag between the different calculations and transmissions. Further, the functionality for blocks 500 and 502 may occur substantially simultaneously or at different times for the same or different access terminals, although they are likely to be the same for different antennas of a single access terminal. Therefore, a calibration ratio may be determined for a given antenna of a given access terminal based upon channel estimates of the forward link and reverse link transmissions that may or may not be consecutive in time.

The calibration ratios are then combined to form a calibration estimate over multiple access terminals, block 506. This combined calibration ratio may include calibration ratios to some or all of the antennas of the different access terminals in a given sector or cell, and have an unequal or equal number of calibration ratios for each access terminal antenna for which one or more calibration ratios are being obtained.

The combined calibration ratio may be obtained by simply averaging the calibration ratios or utilizing the other approaches discussed with respect to FIG. 2, e.g. the approaches discussed with respect to Equations 5 or 7.

Each transmission from each transmission chain of the access point is then weighted with weights based upon the combined calibration ratio for that transmit chain. Also, a combined or joint set of calibrations weights may be utilized for one or more transmit chains of the access point. Alternatively, it is possible to transmit this combined calibration ratio or a calibration instruction based upon the combined calibration ratio to one or more access terminal antennas. The access terminals would then apply the weights based upon the combined calibration ratio to decoding of the transmissions received at the antenna of the access terminal.

Also, in some aspects, the calibration weights are utilized for a particular AGC state and not for other AGC states. As such, block 508, would then only apply to the AGC state during block 500.

Figure 7:
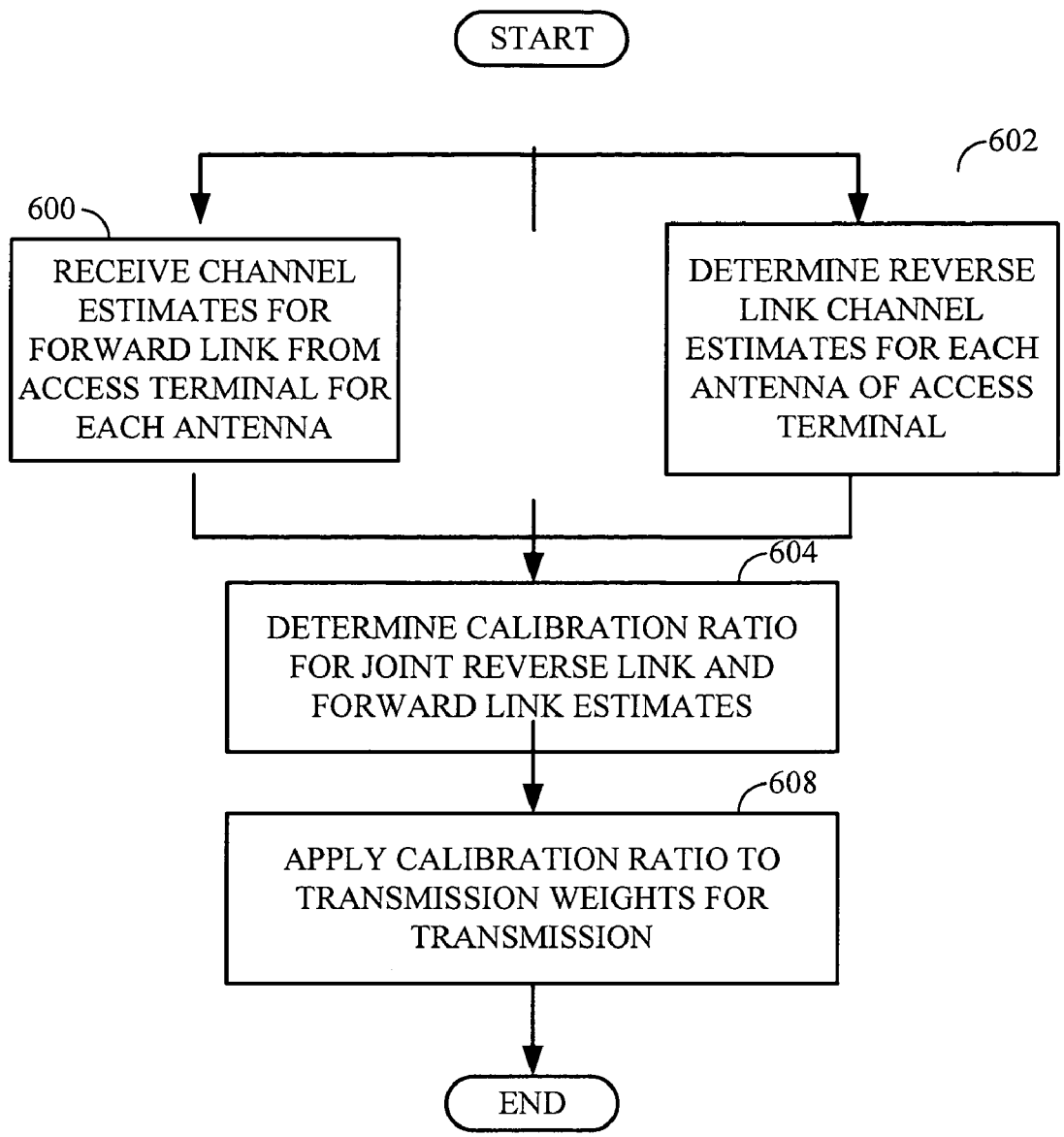
FIG. 7 illustrates aspects of a methodology for calibrating an array of antennas.

FIG. 7 illustrates another methodology for calibrating an array of antennas for transmission. Channel estimates for the forward link are received from access terminals for each of the receive antennas of the access terminal, block 600. As discussed above, these channel estimates may be generated from forward link pilots transmitted by the access point. Additionally, channel estimates for the reverse link information, e.g. reverse link channel pilots, are generated by the access point for each transmit antenna of the access terminal, block 602.

After both forward link and reverse link channel estimates are collected, a calibration ratio that utilizes multiple channel estimates for multiple antennas of multiple access terminals, block 604. In certain aspects, the most recent forward link and reverse link channel estimate with respect to each other in time is utilized. In such cases, multiple estimates for a given access terminal may be performed based upon consecutive channel estimate pairs of forward link and reverse link estimates.

As discussed with respect to FIG. 3, there may be some time lag between the different calculations and transmissions. Further, the functionality for blocks 600 and 602 may occur substantially simultaneously or at different times for the same or different access terminals, although they are likely to be the same for different antennas of a single access terminal. Therefore, the channel estimates may be determined for a given antenna of a given access terminal based upon channel estimates of the forward link and reverse link transmissions that may or may not be consecutive in time.

The joint calibration ratio may be obtained by utilizing a joint optimization process as discussed with respect to FIG. 2, e.g. to Equation 8.

Each transmission from each transmission chain of the access point is then weighted with weights based upon the joint calibration ratio for that transmit chain. Also, a combined or joint set of calibrations weights may be utilized for one or more transmit chains of the access point. Alternatively, it is possible to transmit this joint calibration ratio or a calibration instruction based upon the joint calibration ratio to one or more antennas of one or more access terminals. The access terminals would then apply the weights based upon the joint calibration ratio to decoding of the transmissions received at the antenna of the access terminal.

Also, in some aspects, the calibration weights are utilized for a particular AGC state and not for other AGC states. As such, block 608, would then only apply to the AGC state during block 600.

Figure 8:
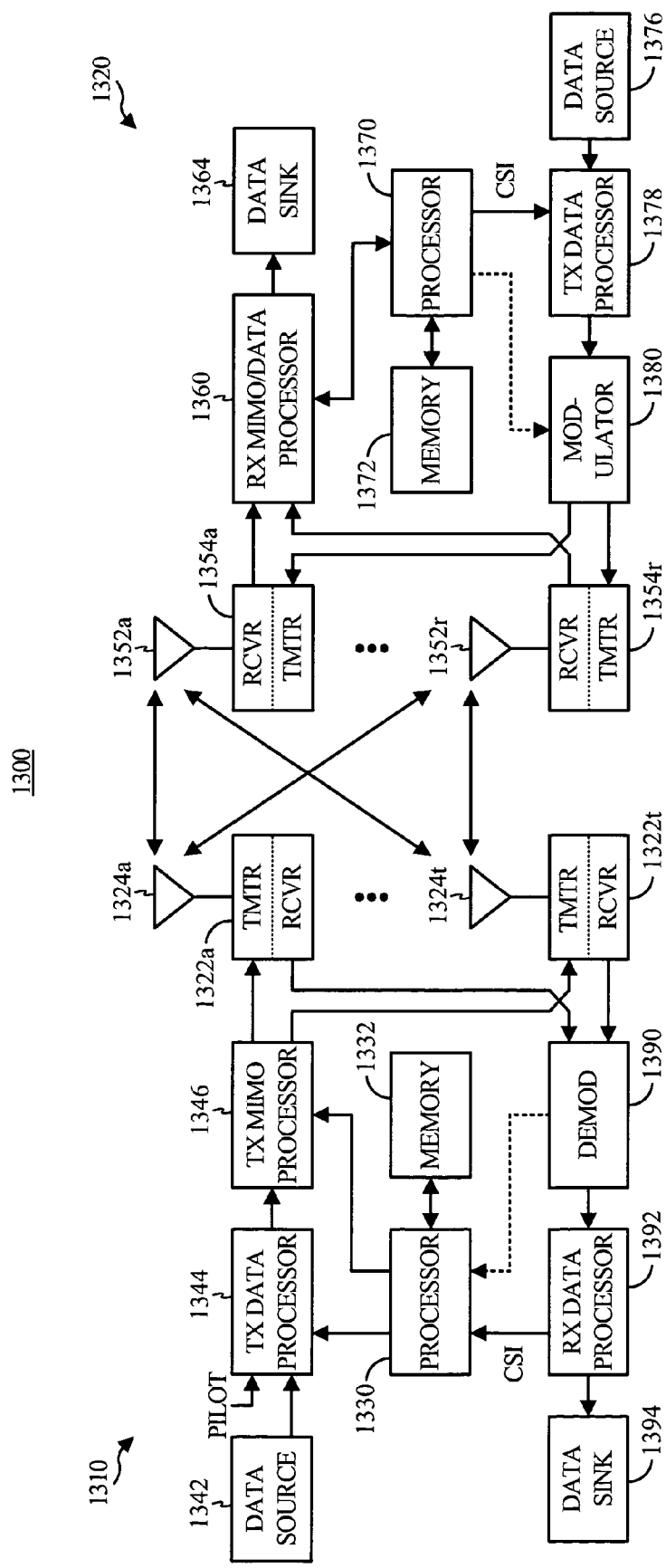
FIG. 8 illustrates aspects of a receiver and transmitter in a wireless communication system

FIG. 8 illustrates an exemplary wireless communication system 1300. The wireless communication system 1300 depicts one base station and one terminal for sake of brevity. However, it is to be appreciated that the system can include more than one base station and/or more than one terminal, wherein additional base stations and/or terminals can be substantially similar or different for the exemplary base station and terminal described below. In addition, it is to be appreciated that the base station and/or the terminal can employ the systems (FIGS. 1-5) and/or methods (FIGS. 6-7) described herein to facilitate wireless communication there between.

Referring to FIG. 8, a transmitter and receiver in a multiple access wireless communication system is illustrated. At transmitter system 1310, traffic data for a number of data streams is provided from a data source 1312 to a transmit (TX) data processor 1344. In an embodiment, each data stream is transmitted over a respective transmit antenna. TX data processor 1344 formats, codes, and interleaves the traffic data for each data stream based on a particular coding scheme selected for that data stream to provide coded data. In some embodiments, TX data processor 1344 applies beamforming weights to the symbols of the data streams based upon the user to which the symbols are being transmitted and the antenna from which the symbol is being transmitted. In some embodiments, the beamforming weights may be generated based upon channel response information that is indicative of the condition of the transmission paths between the access point and the access terminal. The channel response information may be generated utilizing CQI information or channel estimates provided by the user. Further, in those cases of scheduled transmissions, the TX data processor 1344 can select the packet format based upon rank information that is transmitted from the user.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed on provided by processor 1330. In some embodiments, the number of parallel spatial streams may be varied according to the rank information that is transmitted from the user.

The modulation symbols for all data streams are then provided to a TX MIMO processor 1346, which may further process the modulation symbols (e.g., for OFDM). TX MIMO processor 1346 then provides NT symbol streams to NT transmitters (TMTR) 1322a through 1322t. In certain embodiments, TX MIMO processor 1320 applies beamforming weights to the symbols of the data streams based upon the user to which the symbols are being transmitted and the antenna from which the symbol is being transmitted from that users channel response information.

Each transmitter 1322 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 1322a through 1322t are then transmitted from $N_T$ antennas 1324a through 1324t, respectively.

At receiver system 1320, the transmitted modulated signals are received by $N_R$ antennas 1352a through 1352r and the received signal from each antenna 1352 is provided to a respective receiver (RCVR) 1354a through 1354r. Each receiver 1354 conditions (e.g., filters, amplifies, and downconverts) a respective received signal, digitizes the conditioned signal to provide samples, and further processes the samples to provide a corresponding "received" symbol stream.

An RX data processor 1360 then receives and processes the $N_R$ received symbol streams from $N_R$ receivers 1354a through 1354r based on a particular receiver processing technique to provide the rank number of "detected" symbol streams. The processing by RX data processor 1360 is described in further detail below. Each detected symbol stream includes symbols that are estimates of the modulation symbols transmitted for the corresponding data stream. RX data processor 1360 then demodulates, deinterleaves, and decodes each detected symbol stream to recover the traffic data for the data stream which is provided to data sink 1364 for storage and/or further processing. The processing by RX data processor 1360 is complementary to that performed by TX MIMO processor 1346 and TX data processor 1344 at transmitter system 1310.

The channel response estimate generated by RX processor 1360 may be used to perform space, space/time processing at the receiver, adjust power levels, change modulation rates or schemes, or other actions. RX processor 1360 may further estimate the signal-to-noise-and-interference ratios (SNRs) of the detected symbol streams, and possibly other channel characteristics, and provides these quantities to a processor 1370. RX data processor 1360 or processor 1370 may further derive an estimate of the "effective" SNR for the system. Processor 1370 then provides estimated channel information (CSI), which may comprise various types of information regarding the communication link and/or the received data stream. For example, the CSI may comprise only the operating SNR. In some embodiments, the channel information may comprises signal interference noise ratio (SINR). The CSI is then processed by a TX data processor 1378, which also receives traffic data for a number of data streams from a data source 1376, modulated by a modulator 1380, conditioned by transmitters 1354a through 1354r, and transmitted back to transmitter system 1310.

At transmitter system 1310, the modulated signals from receiver system 1350 are received by antennas 1324, conditioned by receivers 1322, demodulated by a demodulator 1390, and processed by a RX data processor 1392 to recover the CSI reported by the receiver system and to provide data to data sink 1394 for storage and/or further processing. The reported CSI is then provided to processor 1330 and used to (1) determine the data rates and coding and modulation schemes to be used for the data streams and (2) generate various controls for TX data processor 1344 and TX MIMO processor 1346.

The processor 1390 may also be configured to perform generation of the calibration ratios and combined calibration ratio, or the joint calibration ratio as discussed with respect to FIGS. 2, 6 and 7 respectively. Further, each antenna 1352a-to 1352r may treated as a separate terminal for the purposes of a combined or joint calibration estimate.

Figure 9:
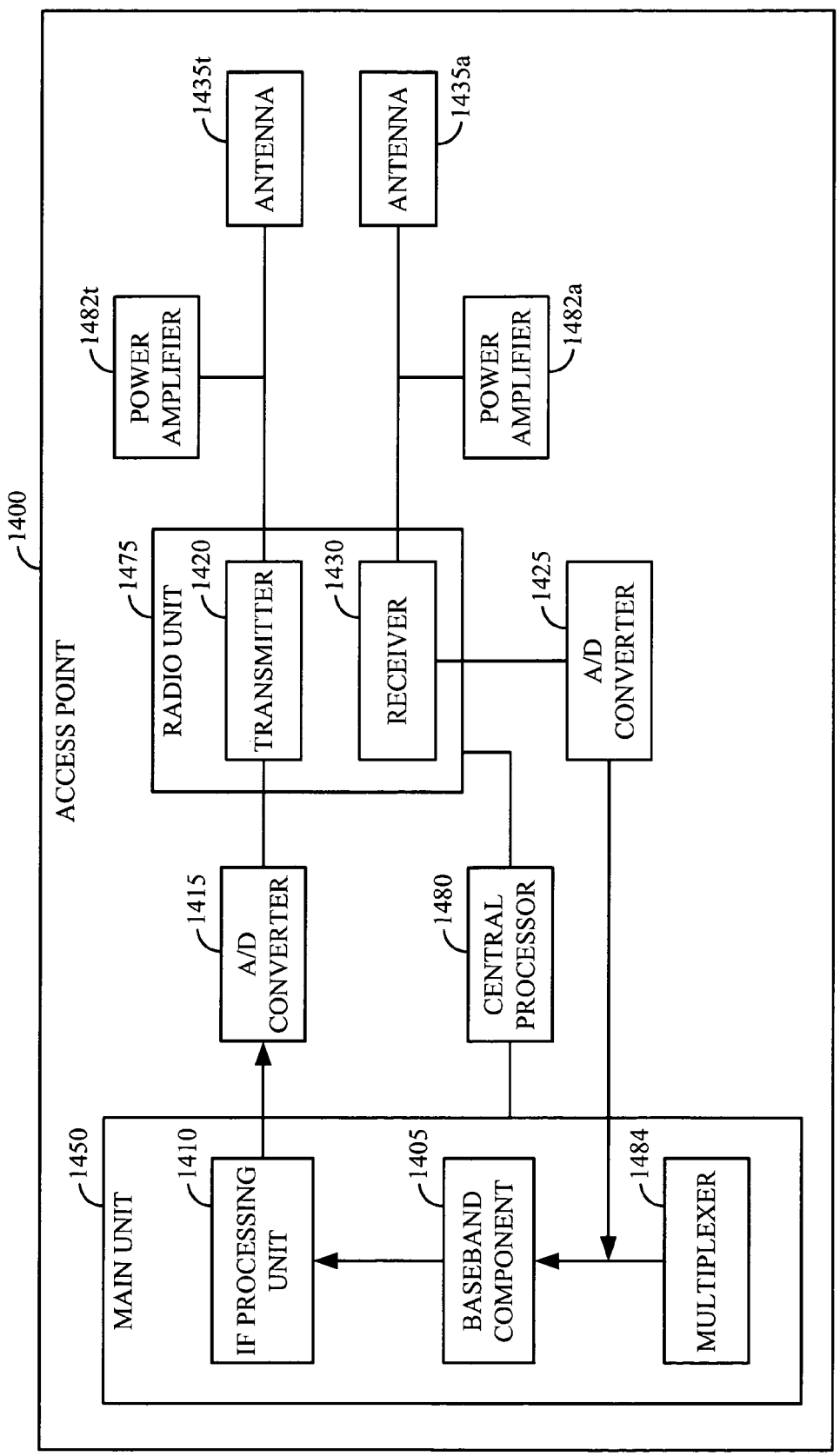
FIG. 9 illustrates aspects of an access point.

Referring to FIG. 9, an access point can comprise a main unit (MU) 1450 and a radio unit (RU) 1475. MU 1450 includes the digital baseband components of an access point. For example, MU 1450 can include a baseband component 1405 and a digital intermediate frequency (IF) processing unit 1410. Digital IF processing unit 1410 digitally processes radio channel data at an intermediate frequency by performing such functions as filtering, channelizing, modulation, and so forth. RU 1475 includes the analog radio parts of the access point. As used herein, a radio unit is the analog radio parts of an access point or other type of transceiver station with direct or indirect connection to a mobile switching center or corresponding device. A radio unit typically serves a particular sector in a communication system. For example, RU 1475 can include one or more receivers 1430 connected to one more antennas 1435a-t for receiving radio communications from mobile subscriber units. In an aspect, one or more power amplifiers 1482a-t are coupled to one or more antennas 1435a-t. Connected to receiver 1430 is an analog-to-digital (A/D) converter 1425. A/D converter 1425 converts the analog radio communications received by receiver 1430 into digital input for transmission to baseband component 1405 via digital IF processing unit 1410. RU 1475 can also include one or more transmitters 120 connected to either the same or different antenna 1435 for transmitting radio communications to access terminals. Connected to transmitter 1420 is a digital-to-analog (D/A) converter 1415. D/A converter 1415 converts the digital communications received from baseband component 1405 via digital IF processing unit 1410 into analog output for transmission to the mobile subscriber units. In some aspects, a multiplexer 1484 for multiplexing of multiple-channel signals and multiplexing of a variety of signals including a voice signal and a data signal. A central processor 1480 is coupled to main unit 1450 and Radio Unit for controlling various processing which includes the processing of voice or data signal.

For a multiple-access system (e.g., a frequency division multiple-access (FDMA) system, an orthogonal frequency division multiple-access (OFDMA) system, a code division multiple-access (CDMA) system, a time division multiple-access (TDMA) system, etc.), multiple terminals may transmit concurrently on the reverse link. For such a system, the pilot subcarriers may be shared among different terminals. The channel estimation techniques may be used in cases where the pilot subcarriers for each terminal span the entire operating band (possibly except for the band edges). Such a pilot subcarrier structure would be desirable to obtain frequency diversity for each terminal. The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 1390 and 1350.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of calibrating an antenna array in a wireless network, comprising:
   receiving first channel estimate information each corresponding to transmissions to at least two antennas of at least two access terminals;
   determining second channel estimate information each corresponding to transmissions from the at least two antennas of the at least two access terminals; and
   determining a calibration ratio based upon each of the first channel estimate information and each of the second channel estimate information,
   wherein determining the calibration ratio comprises solving the equation:

$$g_{i,k,u} = \gamma_u \cdot e^{-j\omega_i \tau_u} \cdot diag(h_{i,k,u}) \cdot \eta + n_{i,k,u}$$
$$= \gamma_{i,k,u} \cdot Z_{i,k,u} \cdot \eta + n_{i,k,u}$$

where $Z_{i,k,u}$ is a diagonal matrix whose diagonal elements are the elements of the channel estimate information $h_{i,k,u}$, $\gamma_{i,u} = \gamma_u \cdot e^{-j\omega_i \tau_u}$, and the subscripts i,k,u, are the tone, time, and user indexes, respectively.

2. The method of claim 1, wherein solving comprising using an MMSE technique to solve the equation.

3. A wireless communication apparatus comprising:
   at least two antennas; and
   a processor coupled with the at least two antennas, the processor configured to determine a calibration ratio, based upon first channel estimate information each corresponding to transmissions to at least two antennas of at least two access terminals and second channel estimate information each corresponding to transmissions from the at least two antennas of the at least two access terminals,
   wherein the processor is configured to determine the calibration ratio by solving the equation:

$$g_{i,k,u} = \gamma_u \cdot e^{-j\omega_i \tau_u} \cdot diag(h_{i,k,u}) \cdot \eta + n_{i,k,u}$$
$$= \gamma_{i,k,u} \cdot Z_{i,k,u} \cdot \eta + n_{i,k,u}$$

where $Z_{i,k,u}$ is a diagonal matrix whose diagonal elements are the elements of a reverse link channel vector estimate $h_{i,k,u}$, $\gamma_{i,u} = \gamma_u \cdot e^{-j\omega_i \tau_u}$, and the subscripts i,k,u, are the tone, time, and user indexes, respectively.

4. The wireless communication apparatus of claim 3, wherein the processor is configured to solve the equation by using an MMSE technique.

5. An apparatus comprising:
   means for processing first channel estimate information each corresponding to transmissions to at least two antennas of at least two access terminals and received from the at least two access terminals;
   means for determining second channel estimate information each corresponding to transmissions from the at least two antennas of the at least two access terminals; and
   means for determining a calibration ratio based upon each of the first channel estimate information and each of the second channel estimate information,
   wherein the means for determining the calibration ratio comprises means for solving the equation:

$$g_{i,k,u} = \gamma_u \cdot e^{-j\omega_i \tau_u} \cdot diag(h_{i,k,u}) \cdot \eta + n_{i,k,u}$$
$$= \gamma_{i,k,u} \cdot Z_{i,k,u} \cdot \eta + n_{i,k,u}$$

where $Z_{i,k,u}$ is a diagonal matrix whose diagonal elements are the elements of the channel estimate information $h_{i,k,u}$, $\gamma_{i,u} = \gamma_u \cdot e^{-j\omega_i \tau_u}$, and the subscripts i,k,u, are the tone, time, and user indexes, respectively.

6. The apparatus of claim 5, further comprising means for solving the equation by using an MMSE technique.

7. A non-transitory computer-readable medium having stored thereon instructions for use by a processor, the instructions comprise instructions to:
   process first channel estimate information each corresponding to transmissions to at least two antennas of at least two access terminals and received from the at least two access terminals;
   determine second channel estimate information each corresponding to transmissions from the at least two antennas of the at least two access terminals; and
   determine a calibration ratio based upon each of the first channel estimate information and each of the second channel estimate information,
   wherein the instructions for determining the calibration ratio comprises instructions to solve the equation:

$$g_{i,k,u} = \gamma_u \cdot e^{-j\omega_i \tau_u} \cdot diag(h_{i,k,u}) \cdot \eta + n_{i,k,u}$$
$$= \gamma_{i,k,u} \cdot Z_{i,k,u} \cdot \eta + n_{i,k,u}$$

where $Z_{i,k,u}$ is a diagonal matrix whose diagonal elements are the elements of the channel estimate information $h_{i,k,u}$, $\gamma_{i,u} = \gamma_u \cdot e^{-j\omega_i \tau_u}$, and the subscripts i,k,u, are the tone, time, and user indexes, respectively.

8. The non-transitory computer-readable medium of claim 7, wherein the instructions to solve the equation by using an MMSE technique.

* * * * *